United States Patent
Evans et al.

(10) Patent No.: US 11,423,084 B2
(45) Date of Patent: Aug. 23, 2022

(54) GENERATING PACKET PROCESSING GRAPHS

(71) Applicant: Metaswitch Networks Ltd., Enfield (GB)

(72) Inventors: Michael Jeffrey Evans, Enfield (GB); Christian Dominic Lund, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 13 days.

(21) Appl. No.: 16/539,186

(22) Filed: Aug. 13, 2019

(65) Prior Publication Data
US 2020/0050633 A1 Feb. 13, 2020

(30) Foreign Application Priority Data
Aug. 13, 2018 (GB) ...................... 1813201

(51) Int. Cl.
*G06F 16/901* (2019.01)
*H04L 69/22* (2022.01)
(Continued)

(52) U.S. Cl.
CPC .......... *G06F 16/9024* (2019.01); *H04L 41/12* (2013.01); *H04L 43/045* (2013.01); *H04L 45/74* (2013.01); *H04L 69/22* (2013.01)

(58) Field of Classification Search
CPC ... G06F 16/9024; H04L 41/12; H04L 43/045; H04L 45/64; H04L 45/74; H04L 47/2441;
(Continued)

(56) References Cited

U.S. PATENT DOCUMENTS 7,536,476 B1 * 5/2009 Alleyne ............... H04L 45/742
709/238
9,595,003 B1 3/2017 Bullis et al.
(Continued)

FOREIGN PATENT DOCUMENTS

EP 2281370 A1 2/2011
EP 3295313 A1 3/2018
(Continued)

OTHER PUBLICATIONS

Jiang et al., "Scalable Packet Classification on FPGA", IEEE Transactions on Very Large Scale Integration (VLSI) Systems, IEEE Service Center, Piscataway, NJ, USA, vol. 20, No. 9, Sep. 1, 2012 (Sep. 1, 2012), pp. 1668-1680, XP011455338, ISSN: 1063-8210, DOI: 10.1109/TVLSI.2011.2162112.
(Continued)

*Primary Examiner* — Shirley X Zhang
(74) *Attorney, Agent, or Firm* — Newport IP, LLC; Han K. Gim

(57) ABSTRACT

A graph data structure for a packet processing system is generated. The structure comprises graph data objects representing classifier nodes of a packet processing graph. The classifier nodes include a root node and leaf nodes. The root node is connected to each of the leaf nodes through respective corresponding packet processing paths through the graph. Each graph data object includes node match data indicative of at least one match to be applied by the respective classifier node. One or more n-type match graph data objects are identified, which include node match data indicative of an n-type match corresponding to content from n header field types. One or more (n+m)-type match graph data objects are identified, which include node match data indicative of an (n+m)-type match corresponding to a com-
(Continued)

bination of content from a (n+m) different header field types. n and m are integer values of 1 or more.

20 Claims, 10 Drawing Sheets

(51) Int. Cl.
*H04L 45/74* (2022.01)
*H04L 41/12* (2022.01)
*H04L 43/045* (2022.01)

(58) Field of Classification Search
CPC ....... H04L 69/22; H04L 47/32; H04L 47/825; H04L 63/0236
See application file for complete search history.

(56) References Cited

U.S. PATENT DOCUMENTS

| | | | | |
|---|---|---|---|---|
| 2010/0067535 | A1* | 3/2010 | Ma | H04L 43/0835 370/401 |
| 2010/0118871 | A1 | 5/2010 | Liu et al. | |
| 2013/0232104 | A1 | 9/2013 | Goyal et al. | |
| 2013/0282766 | A1* | 10/2013 | Goyal | G06F 16/22 707/803 |
| 2014/0226466 | A1* | 8/2014 | Pettersson | H04L 43/028 370/229 |
| 2016/0335298 | A1* | 11/2016 | Haggerty | G06F 16/2246 |
| 2018/0062998 | A1* | 3/2018 | Johnson | H04L 69/22 |
| 2020/0050633 | A1* | 2/2020 | Evans | H04L 41/12 |
| 2020/0053012 | A1* | 2/2020 | Evans | H04L 45/74 |
| 2020/0053025 | A1* | 2/2020 | Evans | H04L 69/22 |

FOREIGN PATENT DOCUMENTS

| | | | | |
|---|---|---|---|---|
| EP | 2820808 | B1 | 4/2018 | |
| EP | 3611885 | A1 * | 2/2020 | ............. H04L 41/12 |
| EP | 3611886 | A1 * | 2/2020 | ......... H04L 47/2483 |
| GB | 2576323 | A * | 2/2020 | ............. H04L 45/60 |
| GB | 2580284 | A * | 7/2020 | ......... G06F 16/9024 |
| GB | 2580285 | A * | 7/2020 | ............. H04L 45/48 |

OTHER PUBLICATIONS

European Extended Search report dated Nov. 25, 2019 for European Application No. 19191336.7.
Combined Search and Examination Report dated Oct. 16, 2018 for UK Application No. GB1813201.9.
Singh et al., SIGCOMM 03, Aug. 25-29, 2003, Karlsruhe, Germany, "Packet Classification Using Multidimensional Cutting", URL:http://cseweb.ucsd.edu/-susingh/papers/hyp-sigcomm03.pdf.
Horman, Simon, "TC Flower Offload", Netronome.
Kounavis et al., "Directions in Packet Classification for Network Processors".
"Open vSwitch Manual", http://www.openvswitch.org/support/dist-docs/ovs-ofctl.8.txt.
"VPP/Introduction To N-tuple Classifiers", https://wiki.fd.io/view/VPP/lntroduction_To_N-tuple_Classifiers, Jan. 27, 2016.
"Clarifying the differences between P4 and OpenFlow", May 18, 2016, https://p4.org/p4/clarifying-the-differences-between-p4-and-openflow.html.

* cited by examiner

| ID | name | Type and Criteria (value) | action | priority |
|---|---|---|---|---|
| A | TTT | Source IP in subnets: 13.64.0.0/11 23.96.0.0/13 87.54.0.0/15 157.60.0.0/16 | drop | 100 (high) |
|  | local | Source IP in subnets: 64.120.128/17 10.0.0.0/24 | Add action E Add action H | 1 (default) 1 (default) |
| B | DSCP1 | Destination port = 5060 (SIP) | DSCP mark 46 | 1 (default) |
| C | DSCP2 | Incoming DSCP = 20 | DSCP mark 32 | 1 (default) |
| D | DSCP3 | Incoming DSCP = 10 | DSCP mark 20 | 1 (default) |
| E | CCC | Destination Port = 80 | Rate limit | 1 (default) |
| F | HTTP steer | Any | Steer to proxy | 1 (default) |
| G | Default | Any | Rate-limit, route | 0 (low) |
| H | HTTP to local server (e.g. for local billing) | Destination Port = 80 | Zero-rate | 1 (default) |

Figure 2

GENERATING PACKET PROCESSING GRAPHS

CROSS-REFERENCE TO RELATED APPLICATIONS

This application claims priority to UK Application No. GB1813201.9, filed Aug. 13, 2018, under 35 U.S.C. § 119(a). The above-referenced patent application is incorporated by reference in its entirety.

BACKGROUND OF THE INVENTION

Field of the Invention

Embodiments of the present disclosure relate to generating packet processing graphs for packet data classifiers, and have particular application in packet processors such as are commonly utilized in network elements such as routers, switches and/or firewalls.

Description of the Related Technology

Packet classification involves identifying flows to which packets belong when they arrive at network elements such as routers, switches and/or firewalls. It is a fundamental network function that enables packet processors to support access control, Quality of Service differentiation, virtual private networking, and other network services. To be classified as belonging to a flow, corresponding for example to a particular network application, each packet arriving at a network element is compared against a set of filters, or rules. Each rule may include criteria relating to one or more fields and their associated values for identifying a network application, a priority, and an action. The criteria generally correspond to specific fields of the packet header—such as the source and destination IP addresses, port numbers, and protocol identifier. A packet is said to match a rule if it matches every header field in that rule. On identifying the matching rules, actions associated with the rules are executed.

Various different kinds of packet classification algorithms are known, including linear search algorithms, hierarchical trie-based algorithms, and match-action classifier algorithms.

Match-action classifiers search a set of match-action table entries until a match is found, in which case the set of one or more actions which are associated with the match are applied to a packet and if no match is found, the packet is allocated to a no-match output. One or more actions may also be associated with the no-match output. A mask is defined for each match-action classifier, to reduce the number of table entries required. Match-action classifiers may be defined as hardware modules in hardware network elements or as software modules in software-defined network (SDN) elements. One SDN control protocol is OpenFlow™, in which a network element is abstracted by a packet processing graph in the form of a pipeline of match-action classifier stages, referred to in OpenFlow as flow tables. In OpenFlow, a side structure is maintained in the packet processing pipeline that includes a set of actions to be applied to a packet. Actions can discard, modify, queue or forward the packet.

Packet data traffic continues to increase with continually higher packet rates requiring continually improved performance from network elements. Further, many network applications produce flows which are relatively short-lived, requiring updates to be carried out very frequently to the network elements, which can affect performance. Various classification techniques are known for increasing search speed and to allow for fast updates, including tuple search space (TSS) algorithms which include hash tables to reduce the search space required to identify a match. However, challenges remain with search speed, which reduces significantly with an increase in number of rules and rule criteria to be processed, and cache memory requirements, which increase significantly with an increase in number of rules and rule criteria to be processed.

SUMMARY

Aspects of the present disclosure provide methods, a system, and computer software according to the appended claims.

A first aspect provides a method of generating a graph data structure for a packet processing system, the method comprising: generating a graph data structure comprising a plurality of graph data objects representing classifier nodes of a packet processing graph, the classifier nodes including a root node and a plurality of leaf nodes, the root node being connected to each of the plurality of leaf nodes through respective corresponding packet processing paths through the graph, wherein each of said graph data objects includes node match data indicative of at least one match to be applied by the respective classifier node, and wherein the method comprises generating the graph data structure by identifying: one or more n-type match graph data objects which include node match data indicative of an n-type match corresponding to content from n header field types, where n is an integer value of 1 or more; and one or more (n+m)-type match graph data objects which include node match data indicative of an (n+m)-type match corresponding to a combination of content from a (n+m) different header field types, where m is an integer value of 1 or more.

In this way, embodiments generate graph data structures including at least one (n+m)-type graph data object (where m is an integer value of 1 or more, which may vary between different classifier nodes) in place of an n-type graph data object. In this example an (n+m)-type graph data object matches against two or more header field types, i.e. is one that matches against a combination of header field types. The means by which header field types are selected to make up a combination can be broadly characterised as a heuristic search.

In one arrangement the graph data structure can be generated by obtaining a plurality of packet processing rules, each said rule including rule data comprising: rule match data indicative of content from one or more header field types to be identified by the packet processing system in order to identify a network application; and rule action data indicative of one or more actions to be applied by the packet processing system to packets of an identified network application. In this arrangement the node match data may be derived from at least part of the rule match data in at least one of the packet processing rules. Further, some of the graph data objects representing one or more of said leaf nodes may include node action data indicative of at least one action to be applied by the respective leaf node, the node action data being derived from the rule action data in at least one of the packet processing rules.

Here, the phrase "at least one action to be applied by the respective leaf node" is to be understood as referring to either an action being attached to the packet to be subsequently executed, or an action being immediately executed on the packet. If an action is attached, it may be attached in the form of associated data which is indicative of an action to be executed after the packet is processed by one or more subsequent data objects of the graph data structure. If an action is executed immediately, it may be executed on a packet before the packet is passed to the next graph data object for processing.

A first n-type match graph data object—which includes node match data derived from a first packet processing rule of said plurality of packet processing rules—and a first (n+m)-type match graph data object—which includes node match data derived from the first packet processing rule—may be identified, and thereafter one of the first n-type match graph data object or the first (n+m)-type match graph data object may be selected for use in configuring a packet processing system. The selection may be performed on the basis of an overall graph data structure cost associated with each of said plurality of processing paths: in particular, the overall graph data structure cost can be reduced by selecting one of the first n-type match graph data object and the first (n+m)-type match graph data object in preference to the other of the first n-type match graph data object and the first (n+m)-type match graph data object.

An exemplary criterion to form the basis of the cost analysis may be traffic profile data, for example traffic profile data that is indicative of an expected proportion of network traffic originating from one or more network applications. Traffic profile data may be derived from traffic analysis and/or traffic modelling, and/or may be derived from the contents of the classification rules such as the network application name and/or protocol identifiers and known or estimated traffic patterns associated therewith. Other criteria include rule-based weighting, protocol-based weighting, mask-based weighting and equal weighting.

It is a feature of graph data structure that each packet processing path comprises zero or more intermediate leaf nodes between the root node and a respective end leaf node. An end leaf node is a leaf node forming the termination of a packet processing path in the graph, at which the classification of a packet by the graph is completed.

When a graph data structure comprises one or more (n+m)-type match graph data objects according to embodiments described herein, a processing path representing a first network application having a relatively high expected proportion of network traffic may include fewer intermediate leaf nodes than a processing path representing a second network application having a relatively low expected proportion of network traffic. Thus, graph data structures according to embodiments described herein effectively route packets with a relatively high level of network traffic through relatively fewer packet processing nodes.

In some embodiments, selection of an n-type match graph data object and the (n+m)-type match graph data object is performed on the basis of a number of nodes in a particular packet processing path. In this way the graph data structure can be optimised the basis of individual packet processing paths.

In cases where (n+m)-type match graph data objects are selected, because this effectively results in a combination of header types in a given graph data object, the number of potential matches to be processed by a classifier may increase relative to the number for an n-type match graph data object. In this case, embodiments may be configured with a parameter, which acts as at threshold, and which, when exceeded, causes the processing of a header field type/types in a given processing rule to be split into a plurality of levels of nodes in the graph data structure.

Each of said classifier nodes may comprise a match-action classifier node. Further, the graph data objects representing one or more of said leaf nodes may include node action data indicative of at least one action to be applied along a match output or no-match output of the respective leaf node.

The graph data structure can be deployed to process packets by loading said generated graph data structure into memory of a packet data processor and classifying packet data in accordance therewith. The packet data processor may be a hardware module or a software module, and a system for generating the graph data structure described herein may be implemented as hardware modules in hardware network elements or as software modules in software-defined network (SDN) elements.

Further features and advantages will become apparent from the following description of preferred embodiments of the invention, given by way of example only, which is made with reference to the accompanying drawings.

BRIEF DESCRIPTION OF THE DRAWINGS

FIG. 2 is an exemplary data structure comprising rule data associated with the graph data structure of FIG. 1;

DETAILED DESCRIPTION OF CERTAIN INVENTIVE EMBODIMENTS

Figure 1:
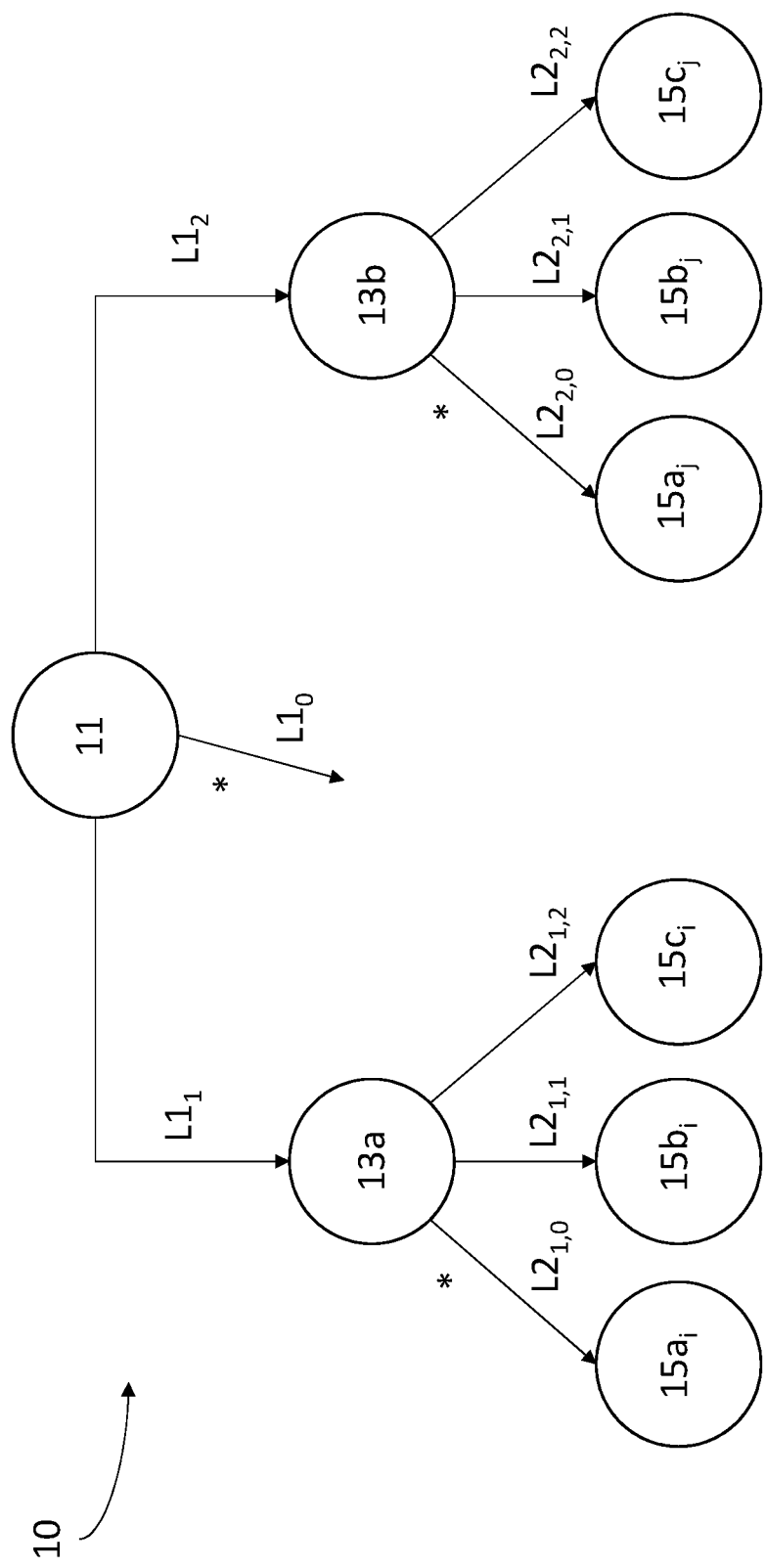
FIG. 1 is a schematic diagram showing an exemplary portion of a graph data structure to be optimised in accordance with an embodiment.

Embodiments described herein relate to computer-implemented methods of, and software code for, automatically generating alternative definitions of collections of match-action packet classifiers in the form of graph data structures, and for selecting an optimised graph data structure for implementation in a network element such as a router, switch and/or a firewall.

The matching logic utilised by the match-action classifiers is preferably one of the following types:

Exact match. Entries in a match-action table are searched for an exact match to selected parts of an incoming packet's header data, e.g. after a unitary bitmask associated with the classifier has been applied, to determine an action specified in the table entry.

Range match. Entries in a match-action table specify a range of matches, e.g. a match based upon port range, to selected parts of an incoming packet's header data, e.g. after a unitary bitmask associated with the classifier has been applied, to determine an action specified in the table entry.

Longest-prefix match. A match is identified from a e.g. a forwarding table. Each entry in the forwarding table may specify a sub-network, and one destination address may match more than one forwarding table entry. The most specific of the match-action table entries—the one with the longest subnet mask—is called the longest prefix match. Match-action table entries specify prefixes with which to match selected parts of an incoming packet's header data, e.g. after a unitary bitmask associated with the classifier has been applied, to determine an action specified in the table entry.

Bloom filter match. A probabilistic match based upon specified criteria; this can be advantageous if the number of potential matches is particularly large. Match-action table entries specify a criteria with which to match selected parts of an incoming packet's header data, e.g. after a unitary bitmask associated with the classifier has been applied, to determine an action specified in the table entry.

Regular expression ("Regex") match. Match-action table entries specify a regular expression match to selected parts of an incoming packet's header data, e.g. after a unitary bitmask associated with the classifier has been applied, to determine an action specified in the table entry.

A collection of match-action packet classifiers may be referred to as a packet processing graph comprising objects. The objects can be understood to be graph data objects representing classifier nodes including a root node and a plurality of leaf nodes, where the root node is connected to each of the plurality of leaf nodes through respective corresponding packet processing paths in the graph data structure.

Each graph data object is configured with node match data indicative of at least one match to be applied by the respective classifier node. Each classifier node may match against one or more header fields of data packets that constitute a flow. Such header fields may, for example, correspond to any one or more of the 5-tuple of layer 3 and layer 4 information, made up of the protocol field (in the IP header), the source and destination IP addresses (again in the IP header) and source and destination ports if appropriate for the protocol (in the UDP or TCP header), in a UDP/IP or TCP/IP packet flow. Other packet header fields, for example layer 2 (e.g. Ethernet) protocol, source address and destination address header fields may also, or alternatively, be configured as matches in a classifier node.

The packet processing graphs are configured such that when a given match-action classifier node has found a match (or a no-match), the configured action may be an action to forward to a subsequent classifier in the graph. A match-action search is then performed by the next classifier node in the graph. In this way, classifier nodes are linked to other classifier nodes in the graph along packet processing path legs, or output edges, and each performs a search for a match-action using its own match-action data, which may be held in a separate match-action table data store for each classifier node. The process repeats for all nodes in a processing path in the graph data structure, until the packet is fully classified according to at least one of the rules to be applied by the packet processing graph.

FIG. 1 shows an exemplary generated graph data structure 10, which is made up of graph data objects 11, 13a, 13b, 15$a_i$, 151$b_i$, 15$c_i$, 15$a_j$, 15$b_j$, 15$c_j$, each of which represents classifier nodes of a packet processing graph. The classifier nodes include a root node 11, a plurality of intermediate leaf nodes 13a, 13b, and a plurality of end leaf nodes 15a, 15b, 15c, 15$a_j$, 15$b_j$, 15$c_j$, the root node 11 being connected to each of the plurality of leaf nodes through respective corresponding packet processing path legs (L1$_i$, L2$_{1,j}$, L2$_{2,j}$ etc.) in the graph data structure. Path legs (L1$_i$, L2$_{1,j}$, L2$_{2,j}$ etc.) are edges in the graph representing packet outputs from the classifier nodes. A packet processing path in the graph data structure typically includes one or more such path legs. A processing path may include only one classifier, i.e. the root node 11, and a single classifier output, for example path leg L1$_0$ in the example of FIG. 1. In this example, each of the nodes represents a match-action classifier, which has one or more match output edges and one no-match output edge, represented by the symbol * in each of FIGS. 1 and 3 to 6 hereafter.

Each of the classifier nodes may be configured with node match data indicative of at least one match to be applied by the respective classifier node. The node match data is derived from classification rule data, with the classification rule data having a plurality of rules for classifying separate network applications, also referred to as flows. In addition to node match data, the classifier nodes may be configured with node action data, which specify actions to be taken on a given packet that is a match with the node match data. Thus, both match output edges and no-match output edges may have an associated action, which may be configured in match-action table entries in a match-action table stored for each respective match-action classifier.

FIG. 2 shows exemplary rule data including rule match data 201, rule action data 203 and rule priority data 207 for different network applications 205: the rule match data 201 is of the form (type, value), where type corresponds to a header field type and value is a value or values (e.g. in the form of a range) for that header field type. The rule action data 203 specifies the action to be taken in respect of a packet that satisfies the rule match data 201. While not shown in FIG. 2, a null type/value for a particular header field type means that the rule is not dependent upon that type of header field, e.g. no (Source IP, value) pair means that the rule is not dependent on the source IP address.

The rule priority data 207 may be used to resolve clashes when actions 203 collide: for example the "default" rule G has "route" as one action, and this matches all packets. It will be appreciated that this action conflicts with "drop", which is the action for service TTT (rule A). The priority data 207 is used to determine which rule prevails (here rule A for service TTT). Actions can be granular, which is to say that they can be dynamic, and can be applied in combination in accordance with the rules that apply, e.g. taking "route" from the rule G, "rate limit" from rule E (preferring this to the default rule G), and the DSCP mark from rule C.

Figure 3:
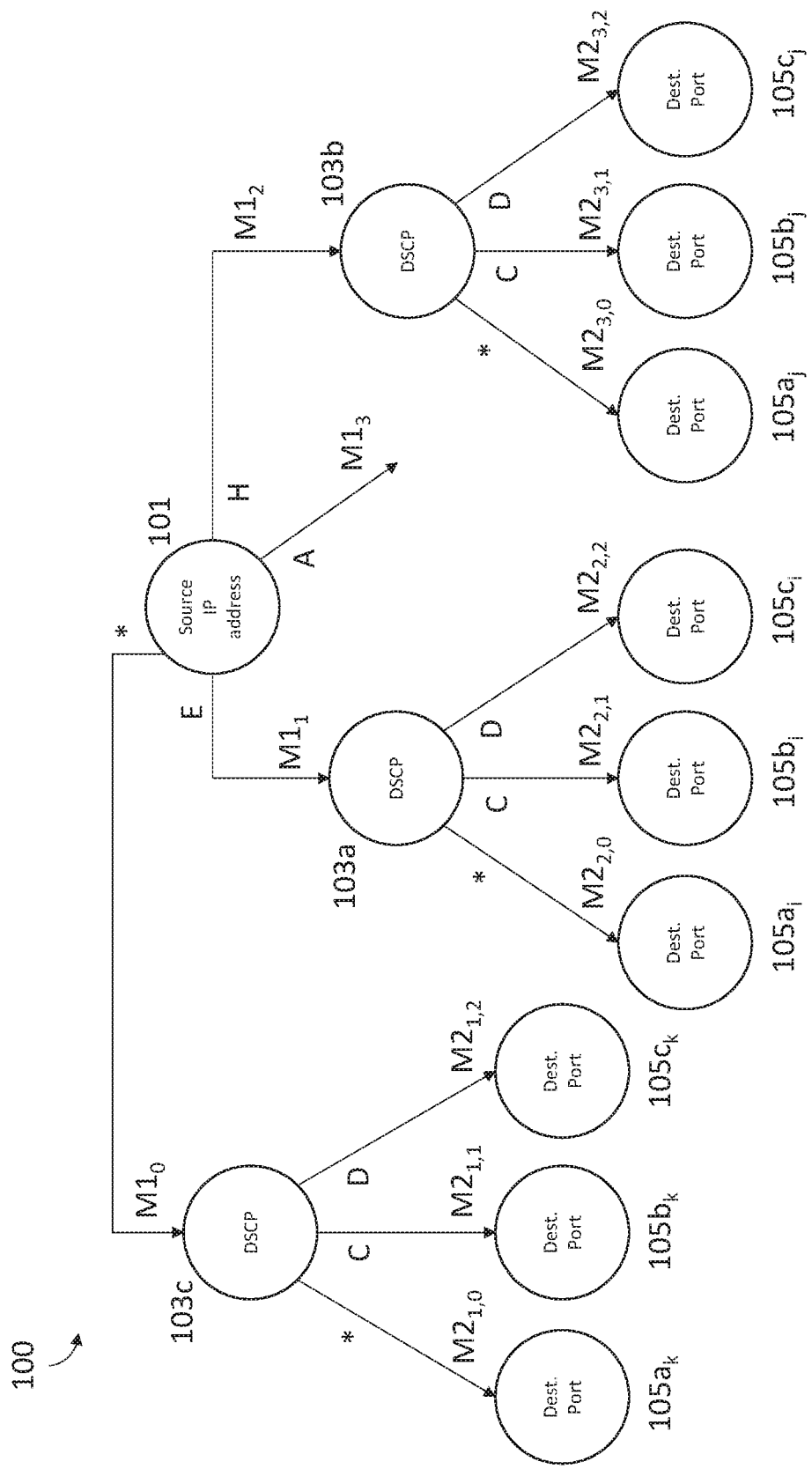
FIG. 3 is a schematic diagram showing the graph data structure portion of FIG. 1, configured in accordance with the rule data of FIG. 2.

FIG. 3 shows a graph data structure for the example of FIG. 2 in which match-action classifier nodes 101, 103a-c, 105$a_{i\ldots k}$, 105$b_{i\ldots k}$, 105$c_{i\ldots k}$ are ordered in accordance with a preconfigured policy such that a source IP address classifier is the root node 101, positioned above nodes 103a-103c corresponding to DSCP classifiers, which are above nodes 105$a_{i\ldots k}$, 105$b_{i\ldots k}$, 105$c_{i\ldots k}$ corresponding to destination port classifiers.

The node match data for the root node 101 is derived from values in the source IP address type data from rule A in the rule match data 201. Thus, it can be seen that path leg M1$_1$ corresponds to packets having source IP addresses in subnets of 64.120.128/17 (labelled E), path leg M1$_2$ corresponds to packets having source IP addresses in subnets 10.0.0.0/24

(labelled H), path leg M1₃ corresponds to packets having source IP addresses in subnets 13.64.0.0/11, 23.96.0.0/13, 57.54.0.15, 157.60.0./16 (labelled A), and path leg M1₀ corresponds to packets with source IP addresses that do not match any IP addresses of rules A, E and H. The node action data is derived from the rule action data illustrated in FIG. 2. Because packets having source IP addresses in subnets 13.64.0.0/11, 23.96.0.0/13, 57.54.0.15, 157.60.0./16 are to be dropped, only packets that proceed along path legs $M1_0$, $M1_1$, $M1_2$, qualify for further matching by further classifier nodes in the graph.

The next classifier node is a DSCP classifier, of which there are three instances 103a, 103b, 103c in the graph data structure, because there are three non-drop output edges from the root node 101 corresponding to different source IP address matches. The node match data for each DSCP classifier node 103a, 103b, 103c, which is derived from the rule match data 201 in each of rules C and D, along with the no-match edge, gives rise to three path legs $M2_{i,j}$ output from each DSCP classifier node 103a, 103b, 103c. Path leg $M2_{i,0}$ is the no-match output for packets that do not match the criteria specified in rules C and D, path leg $M2_{i,1}$ corresponds to packets satisfying DSCP=20 (rule C), while path leg $M2_{i,2}$ corresponds to packets satisfying DSCP=10 (rule D).

Figure 4:
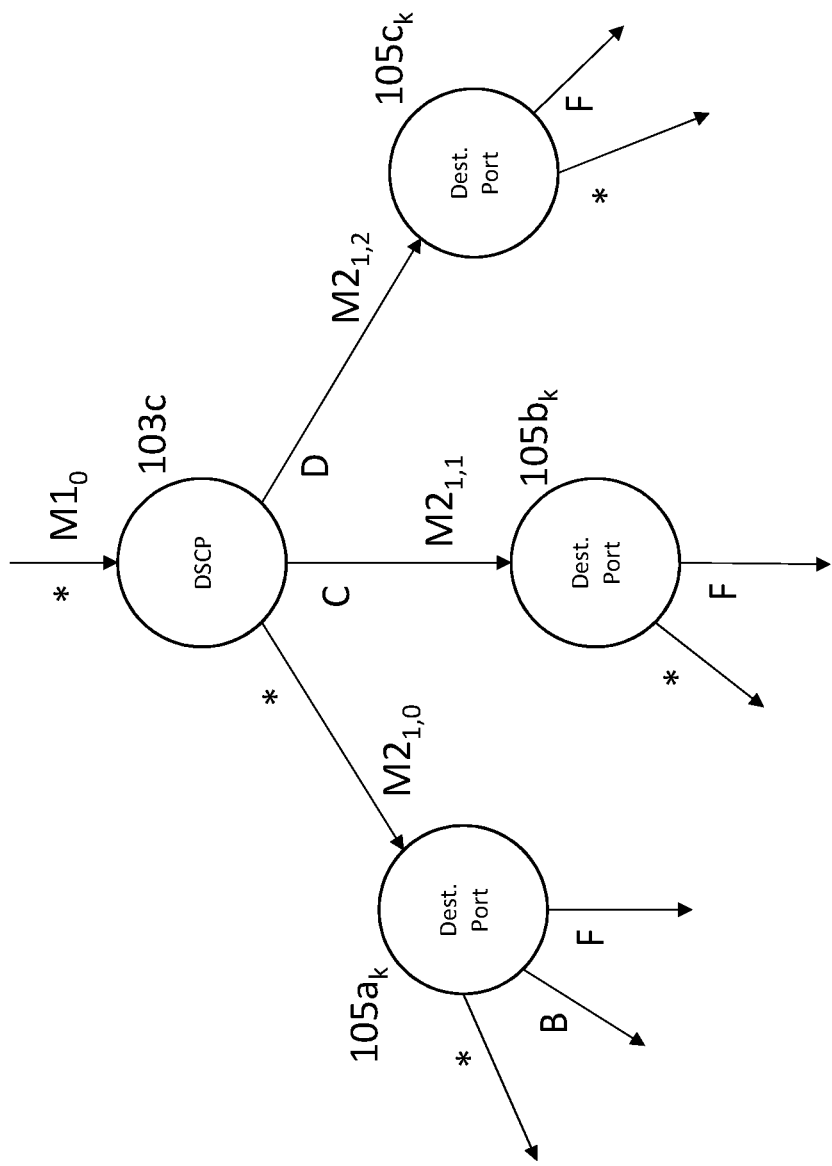
FIG. 4 is a schematic diagram showing a subset of the graph data structure portion of FIG. 3.

FIG. 4 shows the output edges from the destination port classifier nodes shown in FIG. 3; only one set of destination port classifier nodes $105a_k$, $105b_k$, $105c_k$ is shown for clarity, but it will be appreciated from the foregoing that similar output edges will be constructed for each of destination port classifier nodes $105a$-$c_i$ and $105a$-$c_j$. The output edges are not identical for this level of the graph data structure, as between the different sets of destination port classifier nodes $105a$-$c_i$ and $105a$-$c_j$ and $105a$-$c_k$. In particular, and referring back to FIG. 2, rule A requires that packets matching source IP address in subnets 10.0.0.0/24 are routed via path leg Mie and rule H applied thereto. Consequently, none of the packets arriving at classifier node 103c via path leg $M1_0$ will have destination port data matching rule H; those packets will only follow path legs $M1_2$, $M2_{3,0}$, $M2_{3,1}$, $M2_{3,3}$. It will be noted that the only destination port rule that applies to classifier nodes $105b_k$ and $105c_k$ is rule F, despite the fact that rule B has criteria relating to port number. Rules C, D and B clash, since they contain actions on the same output field and have equal priority in the rule definition. An automated rule-breaker algorithm may be used to resolve such a clash. The tie-breaker chosen in this example implementation is to disregard the rule B action (in terms of a path leg closer to the end leaf). Consequently, the only classifier node for which rule B is applied is $105a_k$, since by definition that corresponds to all packets that have not matched the criteria for rules C and D, as applied by classifier node 103c. Note that packets are classified according to default rule G, whilst not shown in FIG. 4, on the outputs of all end leaf nodes.

Once the graph data structure has been generated in accordance with the foregoing and implemented in e.g. a switch (hardware or soft switch), packets arriving into the switch will be processed according to the graph data structure, and the action data identified when building the graph data structure will be applied: in this example, certain packets will be dropped, some will be rate-limited, some will be routed to a particular proxy, some will be zero-rated, some will be counted, others will be marked (DSCP marking) as special packets or reserved for special treatment so they can be recognised for QoS queue priority by e.g. border routers.

It will be appreciated that as regards the foregoing, each graph data object performs an n-type match, which is to say that each graph data object matches against n header field types (where n is an integer value of 1 or more) and is referred to as an n-type graph data object. In this example each n-type graph data object matches against a single header field type, i.e. n=1, and may be referred to as single-type classifiers. Embodiments of the present disclosure generate graph data structures including at least one (n+m)-type graph data object (where m is an integer value of 1 or more, which may vary between different classifier nodes) in place of an n-type graph data object. In this example an (n+m)-type graph data object matches against two or more header field types, i.e. is one that matches against a combination of header field types. The means by which header field types are selected to make up a combination can be broadly characterised as a heuristic search in which e.g. the cost of packet processing for the graph data structure as a whole is analysed, and new classifier nodes—matching against a combination of header field types—are locally created within the graph data structure if their presence results in a reduction in the cost of processing packets through the graph data structure.

When the selection of header field types to be matched in a classifier is dependent upon cost, a first step is to evaluate the cost of processing packets through the graph data structure comprising n-type classifiers. The cost evaluation can be performed based on any one or more of the following criteria:

A. Traffic profile
B. Protocol based weighting
C. Rule based weighting
D. Mask based weighting
E. Equal weighting Starting with criterion A (traffic profile), an example traffic profile for the graph data structure of FIGS. 3 and 4 may indicate the following:

Packets with a DSCP value of "C" had likelihood 0.5/10
Packets with a DSCP value of "D" had likelihood 0.5/10
Packets with other DSCP values had a likelihood of 9/10
Packets with a Port value of "B" had likelihood of 0.5/10
Packets with a Port value of "F" had likelihood of 0.5/10
Packets with other port values had a likelihood of 9/10

Figure 5:
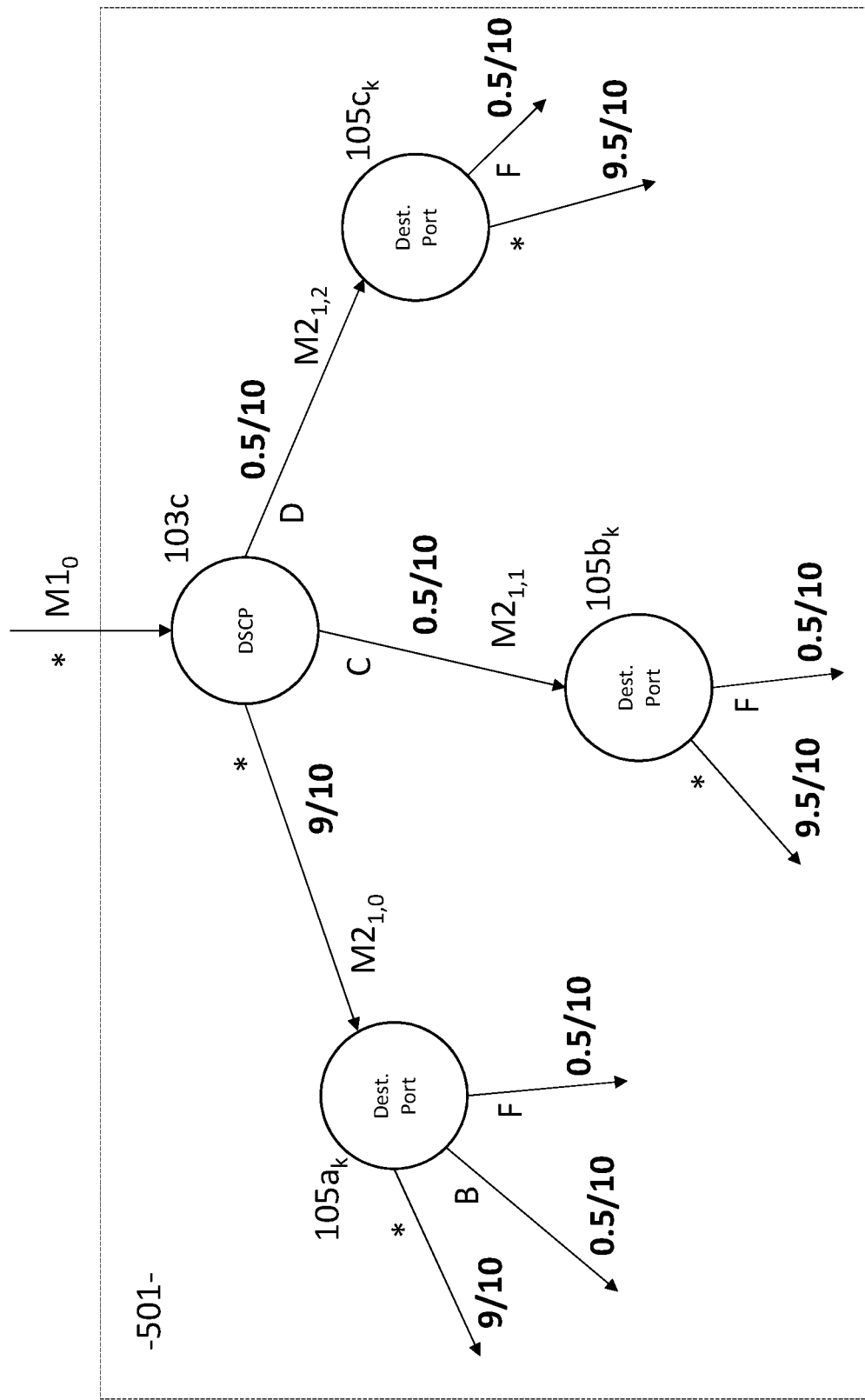
FIG. 5 is a schematic diagram showing the same subset of the graph data structure shown in FIG. 4, with cost values for respective path legs.

FIG. 5 shows a portion of the graph data structure of FIG. 4 when the above traffic profile cost values are superimposed upon respective edges. This leads to the following cost evaluation:

TABLE 1

| Path | Cost components | Cost | levels (# nodes in path) |
|---|---|---|---|
| * – * | 9/10, 9/10 | 81/100 | 2 |
| * – B | 9/10, 0.5/10 | 4.5/100 | 2 |
| * – F | 9/10, 0.5/10 | 4.5/100 | 2 |
| C – * | 0.5/10, 9.5/10 | 4.75/100 | 2 |
| C – F | 0.5/10, 0.5/10 | 0.25/100 | 2 |
| D – * | 0.5/10, 9.5/10 | 4.75/100 | 2 |
| D – F | 0.5/10, 0.5/10 | 0.25/100 | 2 |

As can be seen, the total cost for each path may be calculated by multiplying the likelihoods along each path. Which leads to an overall cost for this graph fragment of:

$$(81+4.5+4.5+4.75+0.25+4.75+0.25)/100 \times 2c = 2c,$$

where c is the cost of traversing a single level of leaf classifier nodes (which in the case of this graph fragments are intermediate and end leaf nodes) in the graph data structure.

This shows that the path corresponding to two no-matches (*—*) is the most costly, with those paths having a single no-match being the next most costly, and the paths having matches (and thus zero "no-matches") being the least costly. These cost values can direct the order with which paths in the graph data structure are optimised in accordance with a so-called greedy search approach. In short, the greedy approach prioritises whichever pair of classifier nodes contributes the most to the overall cost, and attempts to reduce the cost along that path (note that the terms "optimise" and "optimisation" as used herein refer to any available cost reduction, and not necessarily a maximal cost reduction). One path in this graph fragment is contributing the overwhelming majority of the cost, and the optimisation of the other paths may be selectively attempted in order of cost, thus:

an attempt is made to optimise path {*—*} first;
attempted optimisations may be made to paths {C—*}, {D—*} next;
attempted optimisations may be made to paths {*—B}, {*—F} next; and
attempts may be made to optimise paths {C—F} and {D—F} last.

Not each attempt needs to be made in order to produce a final optimised graph—after the first attempt, further attempts may be made if it is determined that optimisation has not yet completed. Completion may be determined, for example, on the basis of comparison with a threshold relating to the proportion of the overall cost contributed by the next path to be optimised, and if lower than the threshold, the optimisation process may be terminated.

For a path through the graph data structure, optimising this path consists of a recursive process of collapsing nodes such that {A1, . . . Ai, Ai+1 . . . AN} becomes A1, A'I, Ai+2, . . . AN}.

Figure 6:
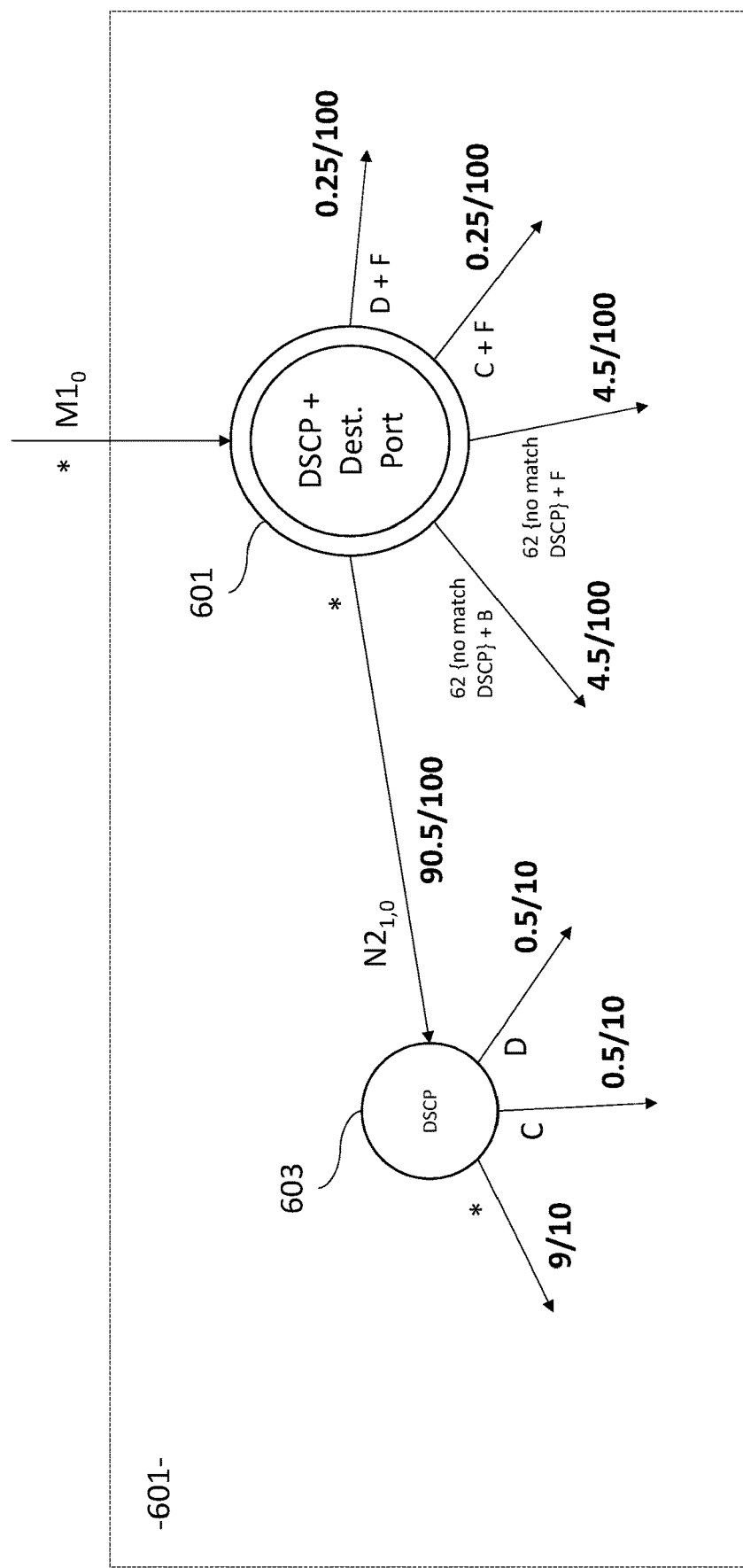
FIG. 6 is schematic diagrams showing an optimised graph data structure according to an embodiment.

So, for this example, the search begins with path {*—*} an optimising involves collapsing the pair of classifier nodes $103c$ and $105a_k$ (the DSCP and port classifier nodes). This involves restructuring the graph fragment depicted in FIG. 5 as 501. The result of this process is graph fragment 601, to be described below, as shown in FIG. 6. The graph fragment is restructured by collapsing the DSCP and destination port classifier nodes to create a combined-type classifier node and then building up the remainder of the graph fragment by sequentially re-applying the rules according to which packets are to be classified. This produces a further DSCP classifier node which receives packets along the no-match output of the combined classifier node, along new path leg $N2_{1,0}$. The actions to be applied, as derived from rules B, C, D and F, are indicated in FIG. 6 accordingly. Note that packets are classified according to default rule G, whilst not shown in FIG. 6, on the outputs of all end leaf nodes.

As a part of the optimisation process, the number of different values to be matched in a given classifier node may be identified as a first step, with a view to splitting out the classifier node into a plurality of levels if the number of values exceeds a threshold (this is referred to as a tuning parameter in the description below). For the case of a DSCP classification node, the DSCP header field is a 6-bit field with 64 possible values. Two of these are in the DSCP rules (C and D), leaving 62 other values, (labelled {no-match DSCP}) that can be written into a table and combined with port rules B and F. This combination of rules relating to different header field types can be embodied by an (n+m)-type classifier node 601, as shown in FIG. 6, leaving n-type classifier node 603 to match the remaining values. Because processing packets through individual levels in the graph data structure incurs a distinct cost, collapsing two nodes together as shown in FIG. 6 provides a means of reducing the overall processing cost from node 601 onwards:

TABLE 2

| Path | Cost components | Cost | levels (# nodes in path) |
|---|---|---|---|
| * – * | 90.5/100, 9/10 | 814.5/1000 | 2 |
| {no-match DSCP} + B | 4.5/100 | 4.5/100 | 1 |
| {no-match DSCP} + F | 4.5/100 | 4.5/100 | 1 |
| * – C | 90.5/100, 0.5/10 | 45.25/1000 | 2 |
| C + F | 0.25/100 | 0.25/100 | 1 |
| * – D | 90.5/100, 0.5/10 | 45.25/1000 | 2 |
| D + F | 0.25/100 | 0.25/100 | 1 |

Which leads to an overall cost for this graph fragment:

$$(4.5+4.5+0.25+0.25)/100 \times c + (814.5+45.25+45.25)/1000 \times 2c = 0.095c + 1.81c = 1.905c$$

It will be understood that 1.905c is significantly lower than 2c, which, as will be recalled from Table 1 is the overall cost for the graph fragment 501 of FIG. 5, namely one comprising only n-type match classifier nodes. A significant saving has been made by reducing the proportion of packets which need to traverse two classifier nodes, by combining and introducing the (n+m)-type classifier node 601. Hence, graph fragment 601 may be selected for implementation in the optimised graph. If optimisation is completed, the final graph to be implemented includes the graph data structure illustrated in FIG. 3, with nodes $103c$, $105a_k$, $105b_k$, $105c_k$ replaced with the graph fragment shown in FIG. 6, and the overall packet processing cost for the entire graph is thus optimised.

Further optimisations may be attempted, as described above. This may result in similar optimisations in relation to nodes $103a$, $105a_i$, $105b_i$ and $105c_i$, these being replaced by a graph fragment similar to that shown in FIG. 6, and/or in relation to nodes $103b$, $105a_j$, $105b_j$ and $105c_j$, these also being replaced by a graph fragment similar to that shown in FIG. 6.

Whilst in the above example, n=1 and m=1, as described above packet processing graphs can be generated where n>1 and/or where m>1. This can be achieved using a recursive process as described above. For example, an attempt may be made to optimise by collapsing node 601 into the Source IP address classifier 101. In this example, the attempt does not result in an improved overall cost and hence the final graph may include only combined-type nodes where n=1 and m=1.

As illustrated in this example, combining is performed for match rule action data corresponding to classifier nodes in adjacent levels in the graph data structure. If the combining of match rule actions for a selected pair of types of classifier nodes results in a lower cost for the graph data structure then further attempts can be made to combine other node match data for the same classifier nodes, i.e. focussing on other path legs of the graph data structure for the same classifier nodes. The combining of different classifier nodes within the same levels can be repeated until the cost increases for a given pair of nodes, whereupon a pair of classification nodes at different levels within the graph data structure is evaluated using the methodology described above.

After optimisation, a processing path having a relatively high expected proportion of network traffic includes fewer intermediate leaf nodes than a processing path representing a second network application having a relatively low expected proportion of network traffic: this can be seen from the overall reduction in number of levels, which will be greater for paths that experience a relatively high proportion of network traffic, compared with paths that experience a relatively low proportion of network traffic.

In the above example, cost is evaluated using a traffic profile, but as mentioned above, other criteria (protocol based weighting, rule based weighting, mask based weighting) can be used to generate a cost for packet processing through the graph data structure. Examples are as follows:

Protocol based weighting: this is predicated upon the fact that there are a limited number of legal values to assign weights. For example:
    as regards the example described with reference to FIGS. 2 to 6, the DSCP field is a 6-bit field, and all the values are allowed—so this would assign 1/64 to each of C and D, and 62/64 to the "*" output.
    for an "Ethernet" classifier node, assuming there are 250 accepted values, 1/250 could be assigned to "IP", 1/250 could be assigned to "ARP" and 248/250 to the "*" output.

Rule based weighting: this is predicated upon configuring the range of legal values and assigning weights assigned. For example:
    as regards the example described with reference to FIGS. 2 to 6, a network operator may understand that in his network most packets are either C or D type DSCP packets, so could configure (rather than supply data) weights/profile information as appropriate.
    for an "Ethernet" classifier node, the operator could manually configure values of ARP=1, *=1, IP=1,000,000.

Mask based weighting: the width of the mask in the value can be used to calculate legal values; for example, as regards an "Ethernet" classifier node there are 16-bits, giving 65,536 values; 1/65,536 could be assigned to "ARP", the same to "IP", and 65534/65536 to the "*" output. This is a suitable option if the protocol of the flow was not known.

Equal weights: each output edge from a given classifier node is assigned an equal weight. So, for the example shown in FIG. 5, each of $M2_{1,0}$, $M2_{1,1}$ and $M2_{1,2}$ would have equal weights of 3.33. This is a less desirable option, since it inevitably is the least relevant to actual flows through a network.

In the example described with reference to FIGS. 2 to 6, the calculated cost values for specific classifier nodes for a particular pair of levels direct the order with which paths in the graph data structure are optimised. As an alternative, all possible classification node pairings for a particular pair of levels within the graph data structure could be established (i.e. establish each combination of two classifier nodes), each pair could be combined, their cost evaluated in the manner described above, and those associated with the lowers cost then selected as (n+m)-type match classifier nodes. This is referred to as a blind pairing search.

In a further alternative a so-called exhaustive search could be employed, based on the number of paths though the graph data structure. For example, if the graph data structure has X levels of classifier nodes and n paths, the algorithm could establish each sub-path of length n−1 and optimise the n−1 recursively until there are just two, and then combine each of these and evaluate the cost. This variant incurs some memory overhead because the pairings optimised for each phase of the searches would be stored in cache: the total number of combination operations is $1+2+n-2+n-1=N(N-1)$. This compares to $2^i$ pairing operations for the greedy search embodiment illustrated with reference to FIGS. 5 and 6 and the blind pairing approach. If n=5 the difference in operations is not significant, but for large values of N, and thus graph data structures having many levels of classifier nodes, the greedy search can be preferable.

As noted above, any given classifier node may be associated with a threshold, which is a parameter indicative of a maximum quantity of potential matches to be processed by the classifier node. More specifically, this parameter is indicative of a limit to a number of potential matches to be processed by the classifier, which if exceeded may require that the classifier node is split into a plurality of levels of classifier node. The parameter can be considered to be a tuning parameter and is typically set based on empirical data relating to the performance of a classifier when implemented in cache memory. The parameter may be configurable so as to generate different optimisations depending on the configuration of the parameter. Use of the tuning parameter can be important for (n+m)-type nodes. Where the number of matches that results from the combination exceeds the threshold, the option to select the resulting graph configuration may be suppressed and an alternative graph configuration may be generated in which the node is split. For many flows, including the one exemplified by FIGS. 2 to 6, the number of matches—even when two or more classifier nodes are combined—may be less than the threshold. In embodiments of the disclosure the threshold is set at a value between 64 and 512, and may be set at 256, for example. When the threshold is set at 256, a maximum number of matches in a DSCP classifier is 64, as the DSCP field is a 6 bit field with 64 possible values, and is thus below the threshold. However, an IP address classifier node needs to contain matches for all rules of the same width, which means that the minimum number of levels for the classifier for the source IP address is related to the number of classes of IP addresses. So, for a classifier node with a rule set containing Classless Inter-Domain Routing (CIDR) address ranges 10.0.0.0/8, 16.0.0.0/8, and 172.19.0.0/16, the classifier node may be split into two levels—a/8 level, and a/16 level.

While in the example described with reference to FIGS. 2 to 6, priority data 207 may be used to determine the ordering of classifier nodes within the packet processing graph 100, the nodes may be ordered according to other criteria, such as a predetermined ordering scheme, a number of rules for a given header field type, or simply the order in which the rules are stored and/or retrieved.

Figure 7:
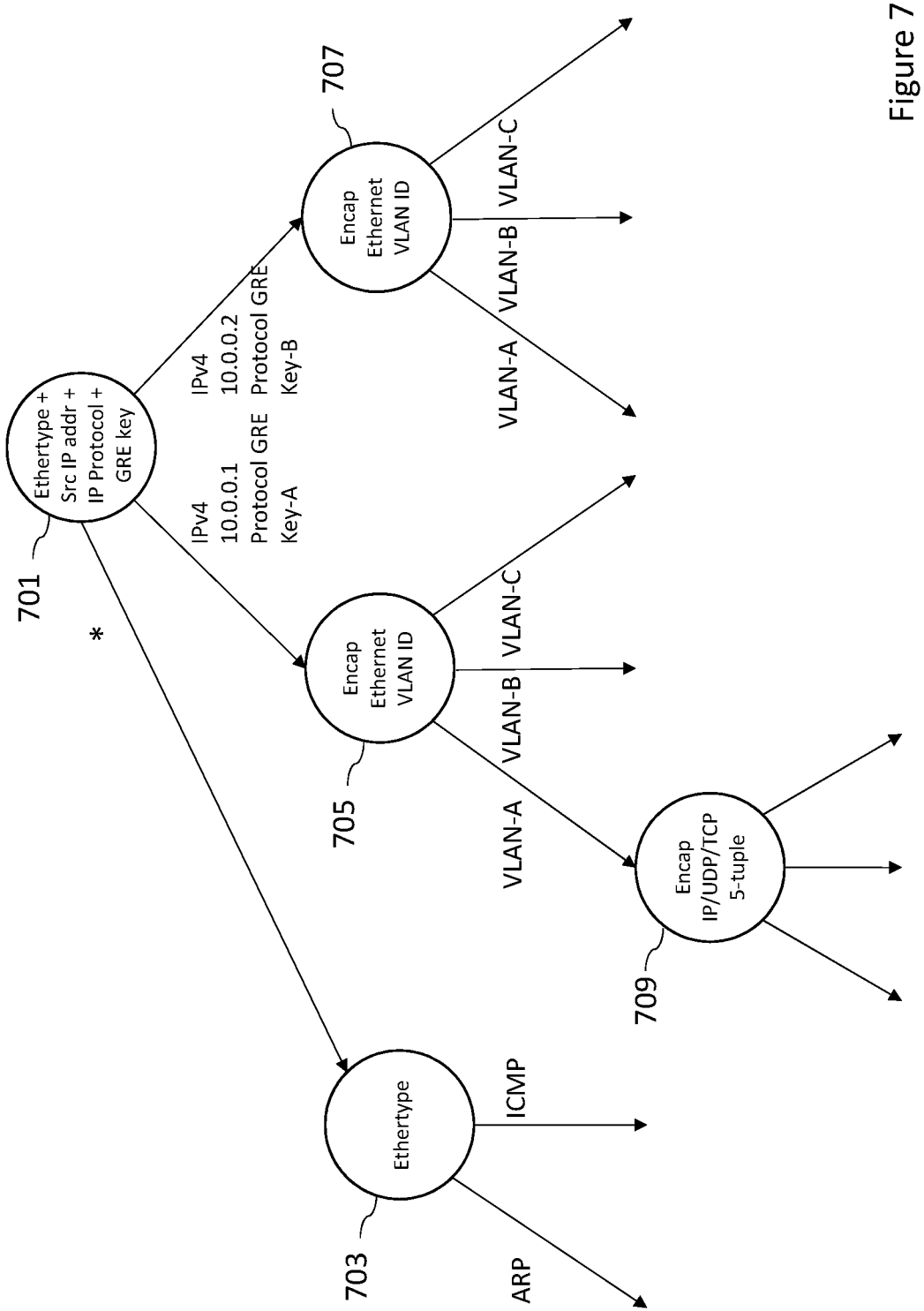
FIG. 7 is a schematic diagram showing an optimised graph data structure according to another embodiment.

FIG. 7 illustrates another optimised graph data structure, which may be generated using the methods described above. A first classifier node 701 may be configured to store node match data indicative of a match corresponding to content from a plurality of packet header field types, including at least an Ethertype field in an Ethernet header. In this example the node match data corresponding to the Ethertype field specifies an IPv4 Ethertype. The first classifier node 701 may be configured to store node match data indicative of a match corresponding to content from at least one field in a tunnel encapsulation header and the tunnel encapsulation header in this example is a Generic Routing Encapsulation (GRE) tunnelling encapsulation header. The first classifier node 701 may also be configured to store node match data indicative of a match corresponding to a source IP address field, which may for example specify a subnet address, and an IP protocol field, which may for example specify the GRE protocol.

The first classifier node 701 may be configured to store a plurality of node match data entries, each corresponding to a separate tunnel endpoint. In this example the tunnel endpoint node match data entries are GRE keys, Key-A and Key-B. In an alternative, the tunnel endpoint node match data entries correspond to source IP addresses (in which case the GRE keys are not required.) Hence, the tunnel endpoint node match data entries may correspond to one or more fields of a network header and/or one or more fields of a network header. Furthermore, a Virtual Private Network (VPN) tunnelling protocol may be used in the network; in such case tunnel endpoint node match data entries may correspond to VPN tunnel identifiers as used in the respective VPN tunnelling protocol.

A second classifier node 703 is connected to the no-match output of the first classifier node 701.

The second classifier node 703 may be configured to store node match data indicative of a match corresponding to one or more packet header fields, including at least the Ethertype field in the Ethernet header. In this example the node match data correspond to an ARP Ethertype and an ICMP Ethertype. The ARP-classified packets may be associated with a forwarding action to forward the ARP packets to an ARP processing node. The ICMP-classified packets may be associated with a forwarding action to forward the ICMP packets to an ICMP processing node. The no-match output of the second classifier node 703 is not illustrated, but may be included and apply a default action, such as to drop packets.

One or more additional classifier nodes 705, 707 may each be arranged in a respective packet processing path to be connected to at least one of the tunnel endpoint node match data entries of the first classifier node 701.

Each of the one or more additional classifier nodes 705, 707 may be configured to store node match data indicative of a match corresponding to content from one or more packet header field types, including at least one field of one or more VLAN headers within an encapsulated Ethernet header. In this example, the node match data correspond to the VLAN ID in the encapsulated Ethernet header, for example VLAN-A, VLAN-B and VLAN-C. Thus, each of the one or more additional classifier nodes 705, 707 is configured to store a node match data entry corresponding to an encapsulated VLAN.

The VLAN-classified packets may be associated with a forwarding action to forward the VLAN packets to a further classifier node 709 which classifies user packet flows. Whilst not illustrated, a further classifier node may be connected to each respective VLAN-classification output of each of the additional classifier nodes 705, 707. The no-match output of the further classifier node 709 is not illustrated, but may be included and apply a default action, such as to drop packets.

The further classifier node 709 may be arranged in a respective packet processing path to be connected, via the additional classifier node 705, to at least one of the tunnel endpoint node match data entries of the first classifier node 701, in this example the Key-A data entry.

The further classifier node 709 may be configured to store node match data indicative of a match corresponding to content from one or more packet header field types, including at least one field from an encapsulated network header or at least one field from an encapsulated transport header. In this example the network header may be an IP header, and the transport header may be a TCP or UDP header.

The further classifier node 709 may be configured may be configured to store a plurality of node match data entries, each of which corresponds to a separate user packet flow. In this example, the user packet flow is identified using node match data corresponding to an IP/UDP/TCP 5-tuple of packet header fields. The flow-classified packet outputs may be associated with a forwarding action to forward the user packet flow packets to a packet routing function for appropriate packet routing to be applied.

The first classifier node 701 may be generated, using the methods described above, by collapsing a single-type Ethertype classifier, in this example an IPv4 Ethertype classifier, into a single-type classifier which classifies tunnel encapsulation, in this example GRE tunnel encapsulation. It may further be formed by collapsing a single-type source IP address classifier, and a single-type IP protocol identifier, into the resulting combined-type classifier.

Figure 8:
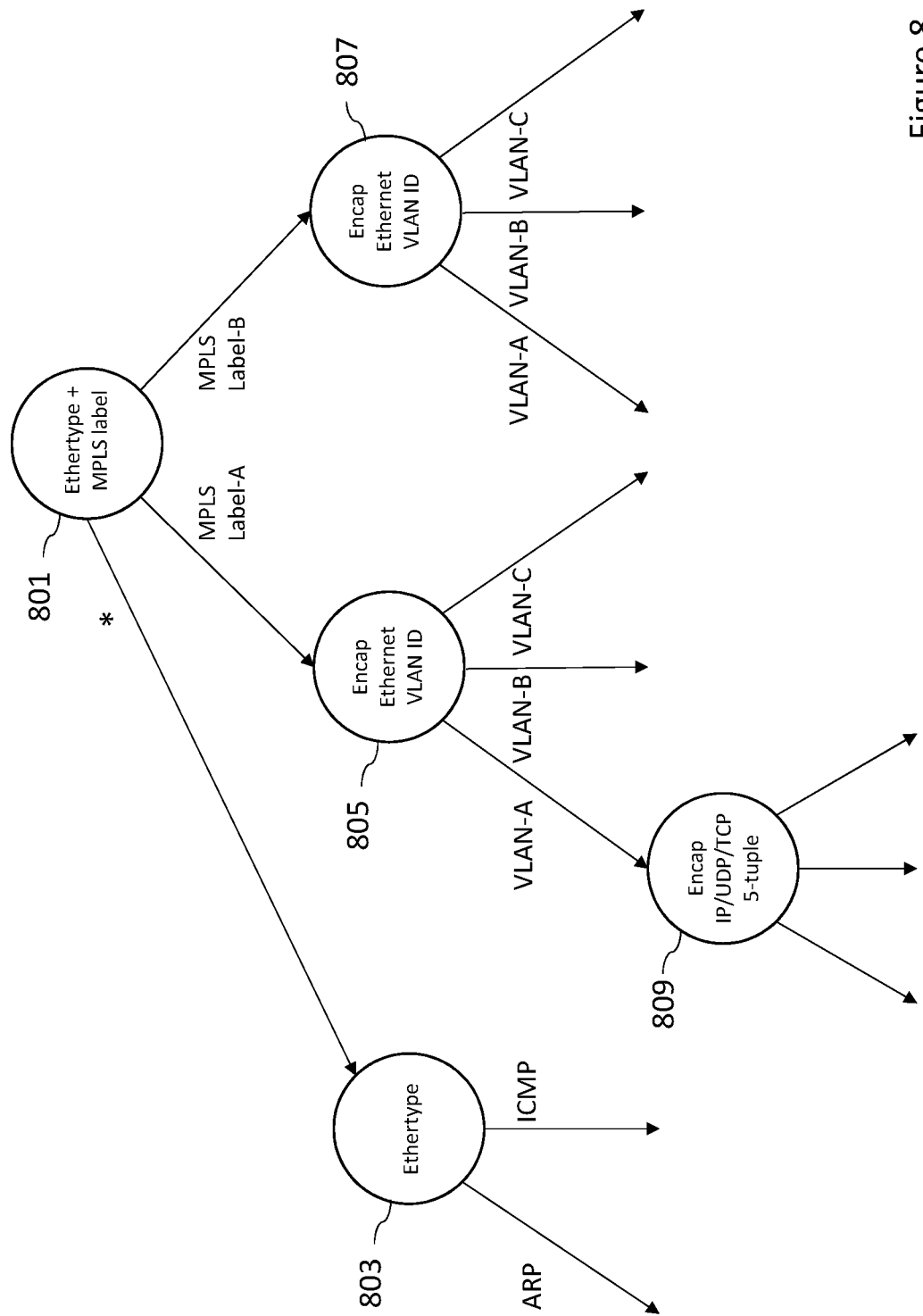
FIG. 8 is a schematic diagram showing an optimised graph data structure according to another embodiment.

The further classifier node 709 may be generated, using the methods described above, by collapsing single-type classifiers, for each of the various header field types of the 5-tuple identifying a user packet flow, into a combined-type classifier. FIG. 8 illustrates another optimised graph data structure, which may be generated using the methods described above. A first classifier node 801 may be configured to store node match data indicative of a match corresponding to content from a plurality of packet header field types, including at least an Ethertype field in an Ethernet header, and at least one field in a tunnel encapsulation header. In this example the node match data corresponding to the Ethertype field specifies an Multiprotocol Label Switching (MPLS) Ethertype and the tunnel encapsulation header is an MPLS tunnelling encapsulation header.

The first classifier node 801 may be configured to store a plurality of node match data entries, each corresponding to a separate tunnel endpoint. In this example the tunnel endpoint node match data entries are MPLS labels, Label-A and Label-B.

A second classifier node 803 is connected to the no-match output of the first classifier node 801.

The second classifier node 803 may be configured to store node match data indicative of a match corresponding to one or more packet header fields, including at least the Ethertype field in the Ethernet header. In this example the node match data correspond to an ARP Ethertype and an ICMP Ethertype. The ARP-classified packets may be associated with a forwarding action to forward the ARP packets to an ARP processing node. The ICMP-classified packets may be associated with a forwarding action to forward the ICMP packets to an ICMP processing node. The no-match output of the second classifier node 803 is not illustrated, but may be included and apply a default action, such as to drop packets.

One or more additional classifier nodes 805, 807 may each be arranged in a respective packet processing path to be connected to at least one of the tunnel endpoint node match data entries of the first classifier node 801.

Each of the one or more additional classifier nodes 805, 807 may be configured to store node match data indicative of a match corresponding to content from one or more packet header field types, including at least one field of one or more VLAN headers within an encapsulated Ethernet header. In this example, the node match data correspond to a VLAN ID in the encapsulated Ethernet header, for example VLAN-A, VLAN-B and VLAN-C. Thus, each of the one or more additional classifier nodes 805, 807 is configured to store a node match data entry corresponding to an encapsulated VLAN.

The VLAN-classified packets may be associated with a forwarding action to forward the VLAN packets to a further classifier node 809 which classifies user packet flows. Whilst not illustrated, a further classifier node may be connected to each respective VLAN-classification output of each of the additional classifier nodes 805, 807. The no-match output of the further classifier node 809 is not illustrated, but may be included and apply a default action, such as to drop packets.

The further classifier node 809 may be arranged in a respective packet processing path to be connected, via the additional classifier node 805, to at least one of the tunnel endpoint node match data entries of the first classifier node 801, in this example the Label-A data entry.

The further classifier node 809 may be configured to store node match data indicative of a match corresponding to content from one or more packet header field types, including at least one field from an encapsulated network header or at least one field from an encapsulated transport header. In this example the network header may be an IP header, and the transport header may be a TCP or UDP header.

The further classifier node 809 may be configured may be configured to store a plurality of node match data entries, each of which corresponds to a separate user packet flow. In this example, the user packet flow is identified using an IP/UDP/TCP 5-tuple of packet header fields. The flow-classified packet outputs may be associated with a forwarding action to forward the user packet flow packets to a packet routing function for appropriate packet routing to be applied.

The first classifier node 801 may be generated, using the methods described above, by collapsing a single-type Ethertype classifier, in this example an MPLS Ethertype classifier, into a single-type classifier which classifies tunnel encapsulation, in this example MPLS tunnel encapsulation, to form a resulting combined-type classifier.

The further classifier node 809 may be generated, using the methods described above, by collapsing single-type classifiers, for each of the various header field types of the 5-tuple identifying a user packet flow, into a combined-type classifier.

Figure 9:
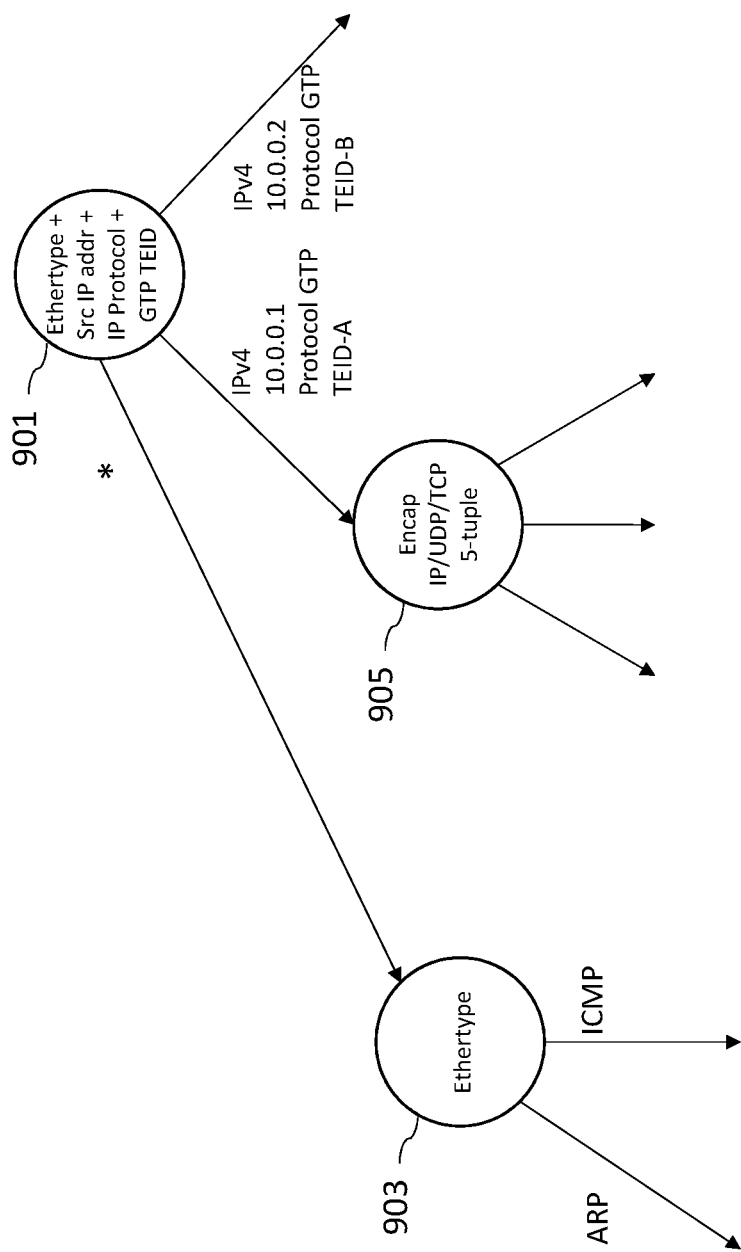
FIG. 9 is a schematic diagram showing an optimised graph data structure according to another embodiment.

FIG. 9 illustrates another optimised graph data structure, which may be generated using the methods described above. A first classifier node 901 may be configured to store node match data indicative of a match corresponding to content from a plurality of packet header field types, including at least an Ethertype field in an Ethernet header, and at least one field in a tunnel encapsulation header. In this example the Ethertype field specifies an IPv4 Ethertype and the tunnel encapsulation header is a GPRS Tunnelling Protocol (GTP) tunnelling encapsulation header. The first classifier node 901 may also be configured to store node match data indicative of a match corresponding to a source IP address field, which may specify a subnet address, and an IP protocol field, which may specify the GTP protocol.

The first classifier node 901 may be configured to store a plurality of node match data entries, each corresponding to a separate tunnel endpoint. In this example the tunnel endpoint node match data entries are GTP Tunnel Endpoint Identifiers (TEIDs), TEID-A and TEID-B.

A second classifier node 903 is connected to the no-match output of the first classifier node 901.

The second classifier node 903 may be configured to store node match data indicative of a match corresponding to one or more packet header fields, including at least the Ethertype field in the Ethernet header. In this example the node match data correspond to an ARP Ethertype and an ICMP Ethertype. The ARP-classified packets may be associated with a forwarding action to forward the ARP packets to an ARP processing node. The ICMP-classified packets may be associated with a forwarding action to forward the ICMP packets to an ICMP processing node. The no-match output of the second classifier node 903 is not illustrated, but may be included and apply a default action, such as to drop packets.

One or more further classifier nodes 905 may each be arranged in a respective packet processing path to be connected to at least one of the tunnel endpoint node match data entries of the first classifier node 901.

The GTP-classified packets may be associated with a forwarding action to forward the GTP packets to a further classifier node 905 which classifies user packet flows. Whilst not illustrated, a further classifier node may be connected to each respective GTP-classification output of the first classifier node 901. The no-match output of the further classifier node 905 is not illustrated, but may be included and apply a default action, such as to drop packets.

The further classifier node 905 may be arranged in a respective packet processing path to be connected to at least one of the tunnel endpoint node match data entries of the first classifier node 901, in this example the TEID-A data entry.

The further classifier node 905 may be configured to store node match data indicative of a match corresponding to content from one or more packet header field types, including at least one field from an encapsulated network header or at least one field from an encapsulated transport header. In this example the network header may be an IP header, and the transport header may be a TCP or UDP header.

The further classifier node 905 may be configured may be configured to store a plurality of node match data entries, each of which corresponds to a separate user packet flow. In this example, the user packet flow is identified using an IP/UDP/TCP 5-tuple of packet header fields. The flow-classified packet outputs may be associated with a forwarding action to forward the user packet flow packets to a packet routing function for appropriate packet routing to be applied.

The first classifier node 901 may be generated, using the methods described above, by collapsing a single-type Ethertype classifier, in this example an IPv4 Ethertype classifier, into a single-type classifier which classifies tunnel encapsulation, in this example GTP tunnel encapsulation. It may further be formed by collapsing a single-type source IP address classifier, and a single-type IP protocol identifier, into the resulting combined-type classifier.

The further classifier node 905 may be generated, using the methods described above, by collapsing single-type classifiers, for each of the various header field types of the 5-tuple identifying a user packet flow, into a combined-type classifier.

The above embodiments are to be understood as illustrative examples. Further embodiments are envisaged. For example, both single-type and combined-type classifiers may operate on packet header fields in any one of, or any combination of, network layer headers (IPv4, IPv6), tunnel encapsulation and VPN headers (GTP, GRE, L2TP, MPLS, VxLAN, SSTP) and transport headers (TCP, UDP, SCTP).

It will be understood that a packet processing graph data structure may be generated using computer software arranged to perform steps in accordance with the exemplary embodiments, optionally with input from a human operator during one or more of the steps described. For example, whilst the computer software may be arranged to generate alternative graph data structures, a human operator may select a graph data structure to be implemented from the alternatives.

As set out in the background section, embodiments described herein apply to software-defined networks or network elements such as routers, switches and firewalls. In the case of network elements, embodiments can be configured as a firmware, as a software application, or as a set of software applications, for execution by the network element, and referred to generally as a graph processing application (not shown in the Figures). The graph processing application is built and compiled based upon the match action data and logic of a graph data structure generated as described above, and executes on packets arriving on an ingress port of the network element.

In the case of software-defined networks, the data and control functions of networking devices are separated: a central controller is located in the control plane and defines the data flows that occur in the data plane. The data plane then manages flow tables whose entries can be populated by the controller. Communication between the controller and the data plane commonly uses a standardized protocol and API.

Figure 10:
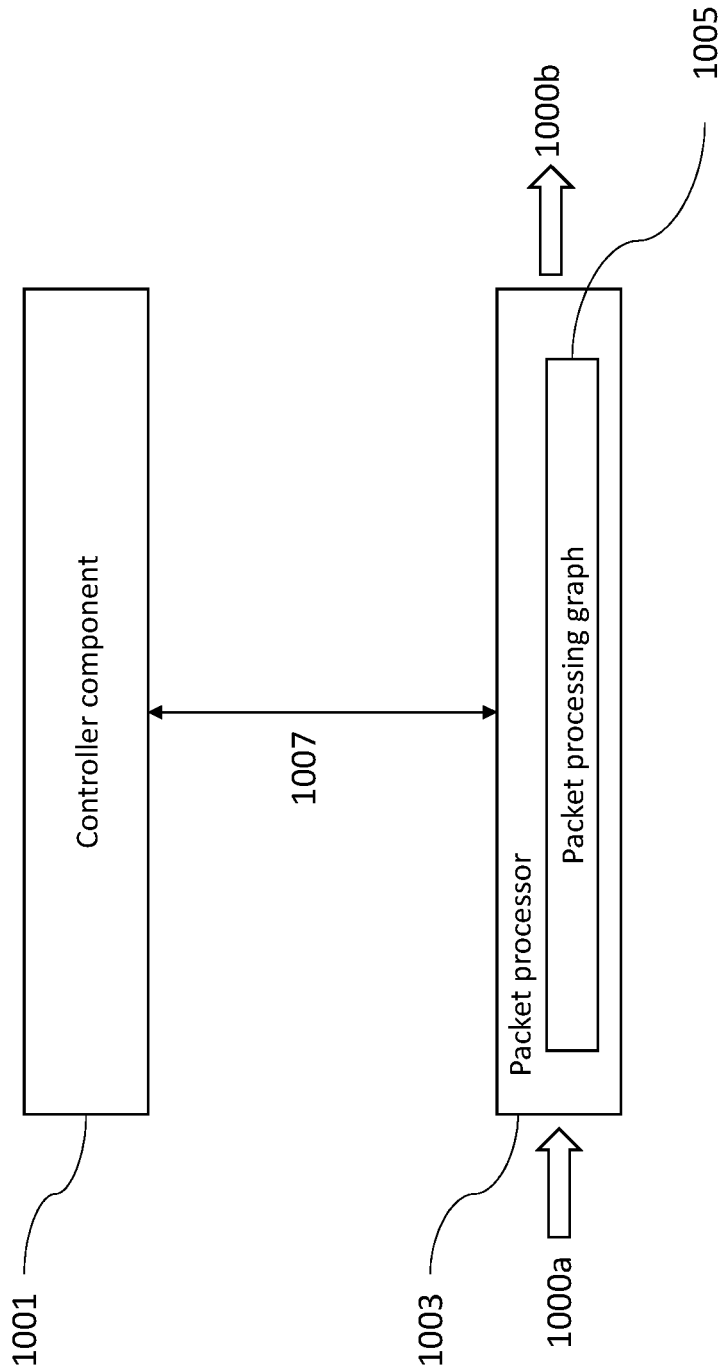
FIG. 10 is a schematic diagram showing exemplary processing components when embodiments are configured within a software defined network.

FIG. 10 shows a software-defined network (SDN) element according to an embodiment of the present disclosure. The SDN element comprises a controller component 1001, operating in the control plane, a packet processor 1003, operating in the data plane, and an application API 1007, exposed by the packet processor 1003 for a particular application. The packet processor 1003 is a system component which processes packets, including receiving them from one or more network interfaces 1000a, modifying them as appropriate, and either discarding them or sending them to one or more network interfaces 1000b for transmission. The packet processor 1003 operates in accordance with a packet processing graph 1005, generated using a graph data structure generated and selected in accordance with examples described above, to control the processing of packets.

When configured according to embodiments described herein, the packet processing graph 1005 may comprises zero or more n-type match graph data objects which include node match data indicative of an n-type match corresponding to content from n header field types and zero or more (n+m)-type match graph data objects which include node match data indicative of an (n+m)-type match corresponding to a combination of content from (n+m) different header field types. Once the graph data structure has been optimised, the resulting n-type (if any) and (n+m)-type graph data objects (if any) are converted into executable code representing match-action classifiers, for processing by the packet processor 1003. The overall control of the graph data structure may be conducted from the controller component 1001, and a particularly advantageous approach is described in applicant's co-filed patent application entitled "Programmable packet data processing system", filed on even date as the subject application, the contents of which are incorporated herein by reference.

NON-LIMITING ADDITIONAL IMPLEMENTATION DETAILS

Although at least some aspects of the embodiments described herein with reference to the drawings comprise computer processes e.g. in the form of processing systems, agents or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a hard disk; optical memory devices in general; etc.

It will be understood that a packet processing graph data structure may be generated using computer software arranged to perform steps in accordance with the exemplary embodiments, and may be executed on a processor or processing system or circuitry which may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the current disclosure, which is defined in the accompanying claims.

What is claimed is:

1. A method of generating a graph data structure by a packet processing system comprising a processor and memory, the graph data structure usable by a packet data processor to process packets in a communications network, the method comprising:

obtaining, by the packet processing system, a plurality of packet processing rules comprising rule match data indicative of one or more packet header field types to be used by the packet data processor to identify a network application;

generating, by the packet processing system, a graph data structure comprising a plurality of classifier nodes, the classifier nodes including a root node and a plurality of leaf nodes, the root node being connected to the plurality of leaf nodes via packet processing paths through the graph data structure;

identifying, by the packet processing system, an (n+m)-type match graph data object which includes node match data indicative of an (n+m)-type match corresponding to a combination of (n+m) different packet header field types, wherein the node match data is derived from the plurality of packet processing rules and the (n+m)-type graph data object matches a combination of two or more packet header field types;

updating, by the packet processing system, the graph data structure to include the (n+m)-type match graph data object as an added packet processing path of the graph data structure, wherein the updating is based on the added packet processing path of the graph data structure associated with a first threshold proportion of network traffic of the communications network and having fewer nodes than at least a second processing path associated with a second threshold proportion of network traffic;

loading the generated graph data structure into a memory of the packet data processor; and classifying, by the packet data processor, packet data in accordance with the generated graph data structure.

2. The method of claim 1, wherein at least one of the graph data objects comprises node action data indicative of at least one action to be applied by a respective node.

3. The method of claim 2, wherein:
the rule match data comprises rule action data indicative of one or more actions to be applied by the packet data processor to packets of an identified network application, and wherein:
the node action data is derived from the rule action data in at least one of the packet processing rules.

4. The method of claim 1, further comprising performing said updating on the basis of an overall graph data structure cost associated with the packet processing paths.

5. The method of claim 4, wherein the (n+m)-type match graph data object is selected in preference to a n-type match graph data to reduce object the overall graph data structure cost.

6. The method of claim 1, further comprising:
obtaining traffic profile data indicative of an expected proportion of network traffic originating from at least one network application; and
performing the updating on the basis of the traffic profile data.

7. The method of claim 6, wherein each processing path comprises zero or more intermediate leaf nodes between the root node and a respective end leaf node, and wherein a processing path representing a first network application having a relatively high expected proportion of network traffic includes fewer intermediate leaf nodes than a processing path representing a second network application having a relatively low expected proportion of network traffic.

8. The method of claim 1, comprising generating the graph data structure based on a parameter indicative of a quantity of potential matches to be processed by a classifier in the graph.

9. The method of claim 8, wherein the parameter is indicative of a limit to a number of potential matches to be processed by a classifier in the graph, further comprising splitting the processing of a header field type in a given processing rule into a plurality of levels of nodes in the graph data structure in accordance with the parameter.

10. The method of claim 1, wherein each of said classifier nodes comprises a match-action classifier node.

11. The method of claim 10, wherein the graph data objects include node action data indicative of at least one action to be applied along a no-match path of a leaf node.

12. A system for generating a graph data structure for a packet processing system configured to process packets in a communications network, the system comprising:
a storage device storing thereon a plurality of packet processing rules including rule data comprising rule match data indicative of one or more packet header field types to be used by the packet processing system to identify a network application; and
a processor; wherein the storage device stores thereon computer-executable instructions that, when executed by the processor, cause the system to:
generate a graph data structure comprising a plurality of classifier nodes, the classifier nodes including a root node and a plurality of leaf nodes, the root node being connected to the plurality of leaf nodes via packet processing paths through the graph data structure;
identify a (n+m)-type match graph data object which includes node match data indicative of an (n+m)-type match corresponding to a combination of (n+m) different packet header field types, wherein the node match data is derived from the plurality of packet processing rules and the (n+m)-type graph data object matches a combination of two or more packet header field types; and
update the graph data structure to include the (n+m)-type match graph data object as an added packet processing path of the graph data structure, wherein the updating is based on the added packet processing path of the graph data structure associated with a first threshold proportion of network traffic of the communications network and having fewer nodes than at least a second processing path associated with a second threshold proportion of network traffic.

13. The system of claim 12, wherein at least one of the graph data objects comprises node action data indicative of at least one action to be applied by a respective node.

14. The system of claim 13, wherein:
the rule data comprises rule action data indicative of one or more actions to be applied by the packet processing system to packets of an identified network application,
and wherein:
the node action data is derived from the rule action data in at least one of the packet processing rules.

15. The system of claim 12, wherein the (n+m)-type match graph data object is updated on the basis of an overall graph data structure cost associated with each of said plurality of processing paths.

16. The system of claim 15, further comprising computer-executable instructions that, when executed by the processor, cause the system to:
reduce the overall graph data structure cost by selecting the (n+m)-type match graph data object in preference to a n-type match graph data object.

17. The system of claim 13, further comprising computer-executable instructions that, when executed by the processor, cause the system to:
store traffic profile data indicative of an expected proportion of network traffic originating from at least one network application, and
perform the updating on the basis of the traffic profile data.

18. A non-transitory computer-readable storage medium having computer-executable instructions stored thereupon which, when executed by one or more processors of a computing device, cause the computing device to:
access a plurality of packet processing rules comprising rule match data indicative of one or more packet header field types to be used by a packet data processor to identify a network application, the packet processor configured to process packets in a communications network;
generate a graph data structure comprising a plurality of classifier nodes, the classifier nodes including a root node and a plurality of leaf nodes, the root node being connected to the plurality of leaf nodes via packet processing paths through the graph data structure;
identify an (n+m)-type match graph data object which includes node match data indicative of an (n+m)-type match corresponding to a combination of (n+m) different packet header field types, wherein the node match data is derived from the plurality of packet processing rules and the (n+m)-type graph data object matches a combination of two or more packet header field types; and update the graph data structure to include the (n+m)-type match graph data object as an added packet processing path of the graph data structure, wherein the updating is based on the added packet processing path of the graph data structure associated with a first threshold proportion of network traffic of the communications network and having fewer nodes than at least a second processing path associated with a second threshold proportion of network traffic.

19. The non-transitory computer-readable storage medium of claim 18, wherein:

at least one of the graph data objects comprises node action data indicative of at least one action to be applied by a respective node;

the rule data comprises rule action data indicative of one or more actions to be applied by the packet processing system to packets of an identified network application; and the node action data is derived from the rule action data in at least one of the packet processing rules.

20. The non-transitory computer-readable storage medium of claim 18, further comprising computer-executable instructions stored thereupon which, when executed by the one or more processors of a computing device, cause the computing device to:

select the (n+m)-type match graph data object on the basis of an overall graph data structure cost associated with each of said plurality of processing paths; and reduce the overall graph data structure cost by selecting the (n+m)-type match graph data object in preference to a n-type match graph data object.

* * * * *